United States Patent [19]
Halene

[11] Patent Number: 4,964,524
[45] Date of Patent: Oct. 23, 1990

[54] PRESSURE VESSEL FOR HYDROGEN STORAGE

[75] Inventor: Clemens Halene, Duesseldorf, Fed. Rep. of Germany

[73] Assignee: Gesellschaft fuer Hybrid und Wasserstofftechnik mbH, Muelheim/Ruhr, Fed. Rep. of Germany

[21] Appl. No.: 279,540

[22] Filed: Dec. 5, 1988

[30] Foreign Application Priority Data

Dec. 4, 1987 [DE] Fed. Rep. of Germany ....... 3741625

[51] Int. Cl.⁵ .............................................. B65D 90/02
[52] U.S. Cl. ......................................... 220/3; 206/0.7; 220/414; 220/465
[58] Field of Search .......................... 220/3, 414, 465; 206/0.7

[56] References Cited

U.S. PATENT DOCUMENTS

| | | | |
|---|---|---|---|
| 1,574,690 | 2/1926 | Radabaugh | 220/465 |
| 2,243,240 | 5/1941 | Zerbe | 220/3 |
| 3,057,509 | 10/1962 | Bernd | 220/3 |
| 3,066,822 | 12/1962 | Watter | 220/3 |
| 3,446,385 | 5/1969 | Ponemon | 220/3 |
| 4,446,111 | 5/1984 | Halene | 206/0.7 |
| 4,524,883 | 6/1985 | Herring | 220/465 |

FOREIGN PATENT DOCUMENTS

| | | | |
|---|---|---|---|
| 701407 | 1/1965 | Canada | 220/3 |
| 38-16675 | of 1963 | Japan | 220/3 |
| 13331 | of 1896 | United Kingdom | 220/3 |

*Primary Examiner*—George E. Lowrance
*Attorney, Agent, or Firm*—Ralf H. Siegemund

[57] ABSTRACT

A pressure vessel for the storage of hydrogen in form of metal hydride is constructed to have an inner tube being relatively thin and made of material copper or aluminum having high thermal conductivity, but the strength of the inner vessel tube is insufficient by and in itself to take up operating pressure in the interior when hydrogen is either fed into the interior of the tube or developed therein; an outer cylindrical tubular vessel jacket is made of stainless steel and abuts against radially outwardly extending ribs of the inner vessel establishing flow channels the rib means are dimensioned not to undergo plastic deformation during operation at the gas storage facility; axial end cap means closes the vessels on both ends; sealed gas nipples means in one or both caps feeds gas into and/or out of the interior of the inner vessel tube.

11 Claims, 3 Drawing Sheets

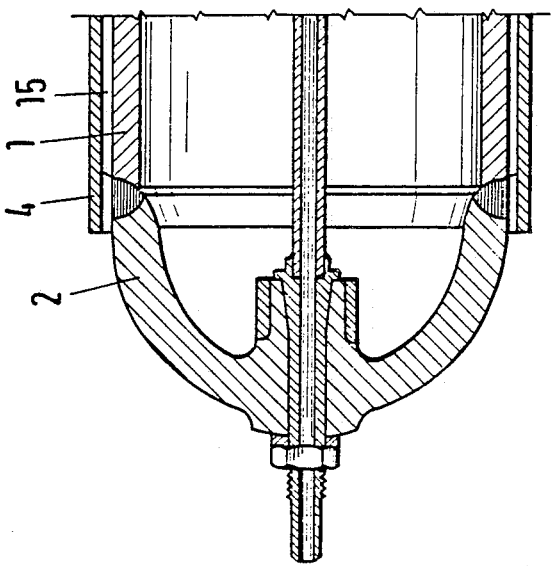
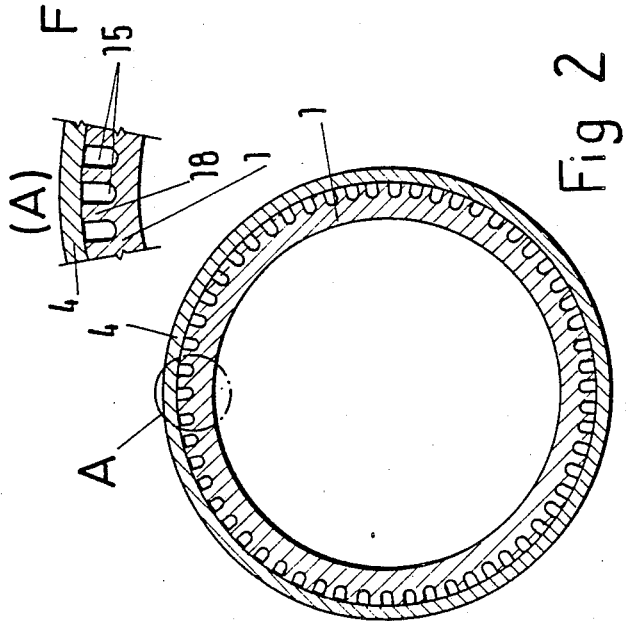
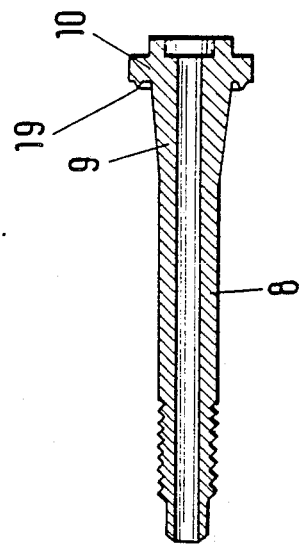

PRESSURE VESSEL FOR HYDROGEN STORAGE

BACKGROUND OF THE INVENTION

The present invention relates to a pressurized vessel for storage of hydrogen in the form of metal hydride, and more particularly, the invention relates to a pressurized container with a cylindrical jacket, end caps, and a storage medium which, on charging, will produce hydride.

There have to be included suitable conduits for feeding and discharge of hydrogen, moreover, is is practical to provide the cylindrical part of the container in a two or twin-wall configuration, the two walls being separated by bars, separating individual flow channels, along which a heat exchange medium flows during hydration and dehydration.

Broadly speaking, a pressurized container of the type to which the invention pertains, is known through German printed patent application No. P 35 02 311. Herein, the outer surface of the container is essentially formed through a circular cylindrical jacket whose axial ends, or front ends, are closed, for example, through spherically shaped end caps. The hydride forming metal alloys store hydrogen in the interior of the vessel, in that during storage and gas feeding hydride is being formed. The bonding enthalpy releases heat which has to be discharged in some fashion in order to obtain, at a given load pressure, the largest possible gas storage. On the other hand, for unloading the storage facility it is necessary to feed heat to the metal hydride so that, indeed, hydrogen can be released which is an energy consuming process.

In order to obtain a high utilization factor of the storage facility it is desirable to load and/or unload the facility in as short as possible a period of time commensurate with a very high gas throughput. This in turn requires a fast heat exchange process between a medium charge which flows in heat relation with the interior of the vessel. In order to improve that heat flow and transfer, it is known to increase the effective surface through ribs, as is customary for heat exchanges to thereby increase the heat transfer in one direction or the other as between heat exchange medium, on one hand, and container wall, on the other hand.

Another kind of hydrogen storage facility is known to have a plurality of parallelly arranged and interconnected longitudinal containers of relatively small diameter, such as 30 mm, so as to obtain a bundle of individual containers, which are then, in turn, placed in a common housing. The heat exchange medium is, in this case, fed into the common housing and flows in the interspaces between the individual containers within that housing. These individual containers have a smooth surface.

This configuration has the advantage that upon dividing the facility into small individual storage facilities, one increases effectively the surface area available for heat exchange. Moreover, one has available, in fact, a heat exchange process that penetrates the vessel throughout, and is thus based only on comparatively short heat transfer paths. On the other hand, it was found that this arrangement was quite expensive and requires an extensive assembly procedure.

In order to increase the storage facility and capacity, it is often desirable to provide the hydride storage facility with a load and unload pressure that is quite high. This, of course, entails a container wall to be very strong. Usually stainless steel is used here because it is also necessary to protect the vessel against corrosion and agression of the hydrogen. On the other hand, stainless steel is a very poor heat conductor and, thus, opposes the process of a fast heat exchange.

The Japanese Patent No. 59-146,902A describes a twin wall hydride storage facility while the inner container is made of copper or aluminum which is a good heat conductor. In addition, ribs extend radially and axially parallel from that inner container towards the outer jacket, and thus constitute an intermediate flow space between the two jackets, or in-between the inner and outer vessel. The individual channels can be passed by a heat exchange medium. The ribs do indeed increase the area available for heat exchange between the container and the heat exchange medium, but this construction requires an unweakened wall of container material, and therefore, the wall has to be quite thick, and will simply take up large hydrogen pressure which then will impede the heat flow to and from the hydride jacket. On the other hand, if the walls are thin, the heat exchange is carried out fast but the operating pressure is too low.

DESCRIPTION OF THE INVENTION

It is an object of the present invention to improve pressure vessels of the type mentioned above which have a high specific capacity, as far as storage and release of hydrogen is concerned, being of a relatively low weight, requiring fast loading and unloading, and will be operating at high gas pressure and still exhibiting a very high degree of safety and a long use life.

In accordance with the preferred embodiment of the present invention, it is suggested to provide the inner wall of a twin wall container configuration to be amenable for taking up only relatively small mechanical loads; the inner container would be too weak if the inner container wall alone were to take up the operating pressure. On the other hand, the outer jacket is configured to take up such a high pressure which is transmitted directly from the inner vessel unto the outer wall and vessel through ribs which are dimensioned so that, even in the case of extreme high pressure transmission no plastic deformation obtains of these ribs so that, indeed, adequate stability is maintained. The inner vessel and container is made of a good heat conductor such as copper or, preferably, an Al based material; the outer vessel is preferably made of stainless steel. By way of example, the thermal conductivity of some aluminum alloys are roughly ten-fold better than the heat conduction of stainless steel. Stainless steel, of course, is the preferred material for the outer container for reasons of strength.

The inventive construction and configuration provides that at least in the cylindrical part, or zone, or area, of the pressure vessel, there must be a twin wall configuration, and the intermediate space between the inner and the outer wall establishes flow channels for the heat exchange medium. For this it is important that the ribs which separate the flow channels, assure that they support the inner wall unto the outer wall, because only the latter is of sufficient strength to take up the pressure, while the former is not.

The ribs are preferably provided with a rounded transition to the wall of the inner container, and from an overall point of view, it is necessary that the ribs will not be plastically deformed. This means that the wall of the inner container vessel and tube can be quite thin which means, in turn, that the heat transfer between the interior of the vessel, on one hand, that is the interior of the inner container tube and the heat exchange medium that flows through the channels, is considerably improved.

Specifically, this means that in spite of a very high pressure, one can use as a material for the inner container, a material that is selected primarily from the point of view of heat exchange and its heat transfer capability and not, at least not as a primary factor to be considered, are the strength configurations. Here then one should use aluminum, copper, or alloys thereof. These materials are comparatively weak, they are certainly weaker than stainless steel but on the basis of the overall configuration, this is no drawback because it is not the inner container that has to take up the pressure ultimately since the pressure is transmitted directly through the ribs onto the outer wall which, in turn, does not have to provide for heat exchange functions. Quite to the contrary, because of heating any heat transfer into the outer container would mean heat loss.

Basically a container of cylindrical configuration establishes tension in the wall in peripheral direction, which is twice the tension in axial direction, so that it may be sufficient in cases to restrict the twin wall configuration of the container to the cylindrical part. The front or end caps do not participate, basically, in the heat transfer and can, therefore, be as thick as necessary. Moreover, a part of the axial tension will also be taken up by the ribs separating the flow channels from the outer container into the cylindrical portion. Thus, the tension is, by no means, just to be carried by the thin portions of the container walls.

The invention permits not only the utilization of basically weak aluminum, or aluminum based structural material, but owing to the physical thinness, one obtains indeed a higher heat transfer between hydride material and heat exchange material, which, in turn, is beneficial from the point of view of weight reduction.

DESCRIPTION OF THE DRAWINGS

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings in which:

FIG. 2 is a section through the container, shown in FIG. 1, as indicated by line II—II in FIG. 1;

FIG. 2a is an enlarged detail as indicated by A in FIG. 2;

FIG. 3 is a longitudinal section through the portion of such a pressure vessel in a simplified configuration;

FIG. 4 is the gas nipple used in any of the examples shown in FIGS. 1 or 3; and

Proceeding now to the detailed description of the drawings, FIG. 1 illustrates a longitudinal section view through a pressure vessel which is provided throughout in a twin wall configuration. For this then, there is an inner tube or tubular container and vessel portion 1 of cylindrical configuration carrying radially outwardly extending ribs 18. The ends of the tube 1 are respectively closed by semi-spherical front end caps 2 and 3. Thus, the elements 1, 2, and 3 together establish the inner vessel in its entirety. This vessel is filled with hydride material, which is not shown. Hydrogen is fed into and out of this vessel through a gas nipple 8, being preferably made of stainless steel, and being capable of connection to an external gas conduit at the outer nipple end 14.

Gas feeding may instead be separately or provided for or through the same facility. In FIG. 1, there is a feeder line and nipple 8, and a separate discharge nipple 8' at the opposite end of the container. A gas filter tube 22 is connected directly to the nipple 8. The filter tube 22 also but indirectly connected to the nipple 8'. In order to compensate for different thermal expansion of the pressure vessel, on one hand, and the filter tube 22, on the other hand, a compensator 21, in terms of a corrugated tubing, is provided in-between the tube 22 and the nipple 8'.

Figure 1:
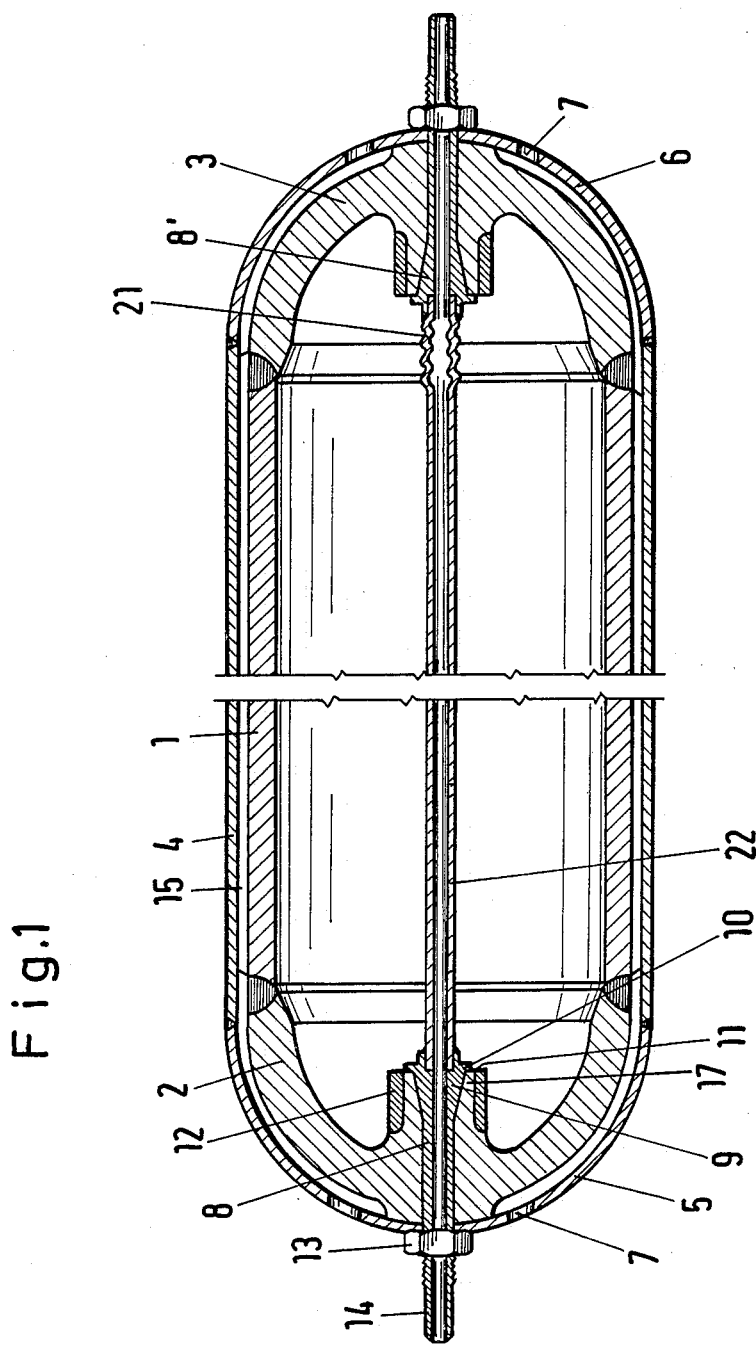
FIG. 1 is a longitudinal section view into and through a pressure vessel, constructed in accordance with the preferred embodiment of the present invention for practicing the best mode thereof.

The inner container and vessel 1, 2 and 3 is completely enclosed and enveloped by an outer container and vessel, which is comprised of a smooth wall tube or cylindrical jacket 4 and end caps 5 and 6. As shown specifically in FIG. 2, the outer tube 4 sits tightly and sealingly upon the bars and ribs 18, which extend radially from the inner tube 1 having a cylindrical inner surface. The ribs do not radially extend the inner surface of vessel or tube 1. Owing to the spacing between the ribs 18, flow channels 15 are established between the bars or ribs 18. The channels are rounded hollows or arch shaped or corbel shaped, adjacent to the inner container 1. In other words, the ribs 18 have a rounded root 18a for merging into the material of the inner tube wall 1.

The flow channels 15 end, respectively, in the spaced defined between the inner caps 2 and 3, on one hand, and the outer caps 5 and 6, on the other hand. specifically, caps 3 and 6 establish a first plenum chamber, and 2 and 5 establish another plenum chamber. Openings 7 in caps 5 and 6 provide access to these plenum chambers and can be connected to heat exchange sources and supplies.

In the particular example shown of FIG. 3 the only difference is to be seen that there are no outer end caps and no plenum chambers accordingly. The ducts and channels just end axially directly adjacent to the inner cap 2' in this instant.

The outer container tube 4, as it sits tightly on the bars or ribs 18 take up and transmit forces, particularly peripheral pressure forces, which are transmitted from the inner container 1 owing to the interior pressure in the vessel 1, directly upon the outer container wall 4, and held dominant extent thereat.

The wall size of container wall and tube 1, therefore, can be dimensioned from a manufacturing point of view, being quite weak without loss in safety and security. As stated, thin walls and/or a structural material of little or low strength, can be provided so as to have available much better heat conduction properties, and this is particularly the case if one uses aluminum or aluminum alloys for element 1 (possibly also 2 and 3).

The gas nipples 8 and 8' run axially out of the tubular container configuration, and, therefore, have to be sealed in and with respect to the caps 2 and 3. This obtains, in accordance with the invention, through a sealing cone 9 which is integral with and part of the nipple 8. The nipple 8 has a threaded end 8a so that a nut 13 can be fastened thereto, to tighten the sealing cone 9 to a flared neck 17 of end cap 2 or 3 as the case may be nut 13 can actually be tightened from the outside.

Alternatively or in addition, one may provide a seal, as shown specifically in FIG. 4. Here a seal bead 19 is provided which is established annually on a flange-like collar 10, being part of the nipple 8. Preferably the sealing bead 19 is wedge shaped in cross-section. The sealing bead 19 engages an abutment surface 11 of the neck 17 of cap 2 (or 3) and is forced upon tightening of the nut 13 into the surface of 11. These surfaces 11 are made to have a good planar configuration. This kind of tightening and sealing is particularly effective, if the caps 2 and 3 are also made of aluminum.

In case one uses a relatively soft material for the caps 2 and 3, one has to make sure that the cone seal 9 of the nipple will not provide undue deformation, particularly of the neck portion 17 of the nipple feed through arrangement. In this case then, the neck 17 is re-inforced through an armoring collar 12 being made of a stronger material, such as stainless steel. This ring or annulus 12 is tightened around the outside of the neck 17 and not only reinforces the (soft) neck material but also reinforces the seal between cone 9 and the internal conical surface of neck 17.

The outer container wall 4 and also the outer caps 5 and 6, are preferably made of stainless steel, which avoids duly corrosion problems. The poor conductivity is not an impediment as far as practicing the invention is concerned, but is actually an advantage to avoid e.g. heat loss towards the outside when active heating of the vessel through a hot medium that flows in channels 15 is desired.

In some instances it may be necessary or desirable to strengthen the outer tube wall 4 through carbon fibers or the like, or to make the wall out of such fibrous materials, because fibrous compounds are usually low in weight but very strong, as far as applied tension is concerned.

In order to further improve heat transfer to the wall of the inner vessel and container 1, the ducts 15 could run helically around the cylindrical part 1 of the pressure vessel. A helical flow pattern increases the area of contact with heat transfer media as compared with a straight axial configuration for the channels.

Figure 5:
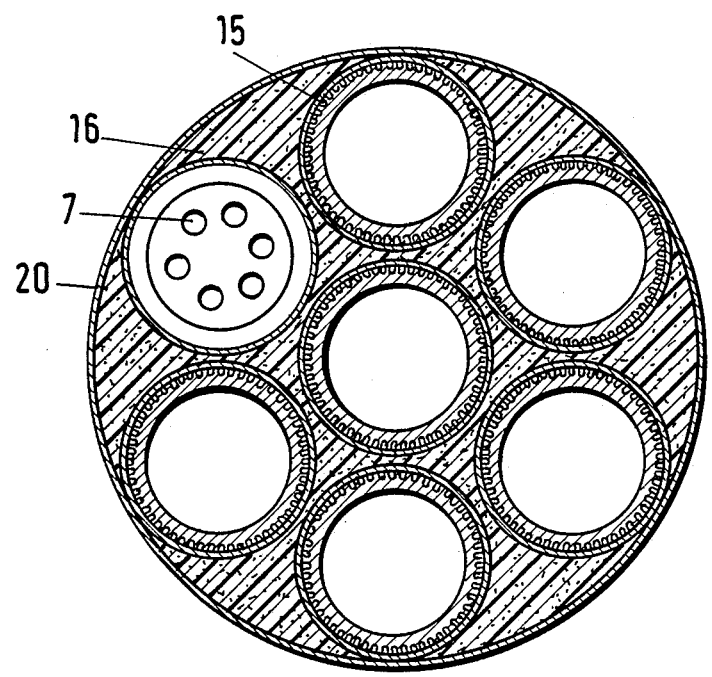
FIG. 5 illustrates an arrangement involving plural containers within a common housing.

FIG. 5 illustrates an axial view of a storage module which is constructed from seven individual pressure vessels of the type thus described. This module is enclosed in a common housing 20, having a tubular configuration. The interspaces between the individual containers, as well as between all of the containers and the inner wall of the housing 20, is filled with a filler 16, for example, foam, having a low thermal conductivity and a low storage capacity for heat. The heat exchange medium necessary for operating the hydride storage facility, being either heating or cooling water, is fed to the front axial end of the housing 20, and now flows either through the opening 7 in the outer cap and directly into the plenum space between the inner and outer caps, as far as individul containers of the pressure vessel is concerned, to continue through the flow channels 15, and out again.

This is shown in an example in FIG. 5. The other process vessels are assumed not to have outer end caps and axial end and plenum spaces are not provided for. Instead feeding is required directly in contact with the open end of the channels 15. Both kinds of constructions are shown by way of example in a single figure.

The interspace between the individual containers, can either be filled with a low weight material, for example, foam preferably with closed pores so that flow space for heat exchange material is provided for only in those areas which are not occupied by foam.

The heat exchange material will, therefore, be flowing only through those zones which are constructed for exactly that purpose. These are, of course, channels 15 and no other place with access at either end which is, of course, also the end of container 20. From an overall point of view then, of course, the module is quite low in rate and owing to the high capacity of each individual storage facility, the switchover from loading to unloading is quite fast.

The invention is not limited to the embodiments described above, but all changes and modifications thereof not constituting departures from the spirit and scope of the invention are intended to be included.

I claim:

1. Pressure vessel for the storage of hydrogen in form of metal hydride, comprising:
    a first inner vessel tube with a cylindrical inner surface being relatively thin and/or made of material of high thermal conductivity, the strength of the inner vessel tube being insufficient by and in itself to take up operating pressure in the interior of the tube when hydrogen is either fed into the interior of the tube or developed therein;
    an outer cylindrical tubular vessel jacket being made of high strength materials;
    radially extending rib means on said inner vessel, to be extending towards enforced abutment with the inner wall of said outer jacket, without radially extending the inner surface of the vessel there being flow channels in-between the rib means on the outside not inside the tubes, said rib means dimensioned not undergo plastic deformation during operation at the gas storage facility;
    axial end cap means for closing said inner vessel on both ends;
    gas nipple means for feeding gas through at least one of said end cap means into and/or out of the interior of said inner vessel tube; and
    sealing means for sealing the nipple relative to the axial end cap means.

2. Pressure vessel as in claim 1, said ribs having rounded transitions towards the inner wall proper of the inner vessel tube.

3. Pressure vessel as in claim 1, said end cap means being an inner and an outer end cap for each end, there being a plenum chamber for a heat exchange medium provided in between the respective inner and outer caps on each end of the tube.

4. Pressure vessel as in claim 1, said inner vessel tube being made of aluminum or aluminum alloy.

5. Pressure vessel as in claim 1, said outer container being made of stainless steel.

6. Pressure vessel as in claim 1, said outer container being made of fiber-re-enforced material or being re-enforced through fibers.

7. Pressure vessel as in claim 1, there being a conical seal provided for connecting the gas nipple to said end cap means.

8. Pressure vessel as in claim 7, said nipple having a conically shaped sealing portion.

9. Pressure vessel as in claim 8, there being a conical neck as part of the end cap means, an armoring ring extending around said neck for reinforcing it.

10. Pressure vessel as in claim 1, the gas nipple being provided with a flange-like collar, being an annular bead arranged on that collar facing the end cap, the bead having a section which has a conical cross section and in an assembled state is urged into a plane abutment on the inside of the cap means.

11. Pressure vessel as in claim 9, the neck being also made of aluminum or an aluminum alloy.

* * * * *